United States Patent [19]

Storey

[11] 4,249,209
[45] Feb. 3, 1981

[54] VIDEO NOISE REDUCTION SYSTEM

[75] Inventor: Richard Storey, Sutton, England

[73] Assignee: British Broadcasting Corporation, London, England

[21] Appl. No.: 23,592

[22] Filed: Mar. 26, 1979

[30] Foreign Application Priority Data

Apr. 3, 1978 [GB] United Kingdom ............ 12972/78

[51] Int. Cl.³ .................................. H04N 5/21
[52] U.S. Cl. .................................. 358/167
[58] Field of Search ............ 358/36, 37, 166, 167; 328/165, 167

[56] References Cited

U.S. PATENT DOCUMENTS

| 3,961,274 | 6/1976 | Jones et al. | 358/167 |
| 4,058,836 | 11/1977 | Drewery et al. | 358/167 |
| 4,064,530 | 12/1977 | Kaiser et al. | 358/167 |

Primary Examiner—John C. Martin
Attorney, Agent, or Firm—Robert F. O'Connell

[57] ABSTRACT

Reduction of noise in a television signal is achieved by comparing signals from successive scans to produce a difference signal. Low amplitude differences are assumed to represent noise and are attenuated. Differences above a predetermined level are assumed to represent movement and are not so attenuated. The attenuation is achieved by a multiplier which receives as multiplier the output of a non-linear transfer characteristic element. The non-linear element receives the differences after rectification and after passing through a variable-gain element. The non-linear element is such that above a predetermined value a constant predetermined minimum attenuation factor applies. A noise measurement circuit measures the noise present in the difference signal and controls the gain of the variable-gain element accordingly. Several noise-measurement circuits may be provided, a selected one of which is used in dependence upon the magnitude of the input signal to the apparatus.

4 Claims, 8 Drawing Figures

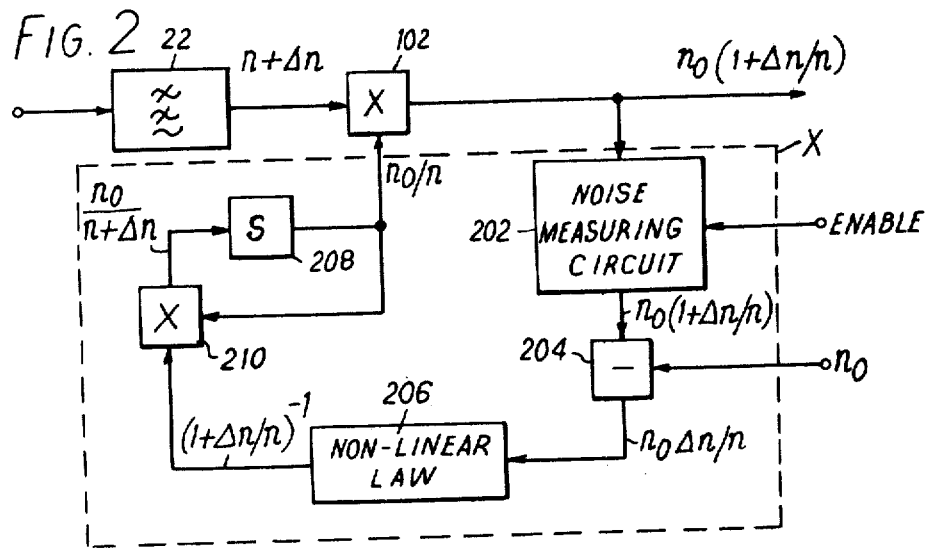
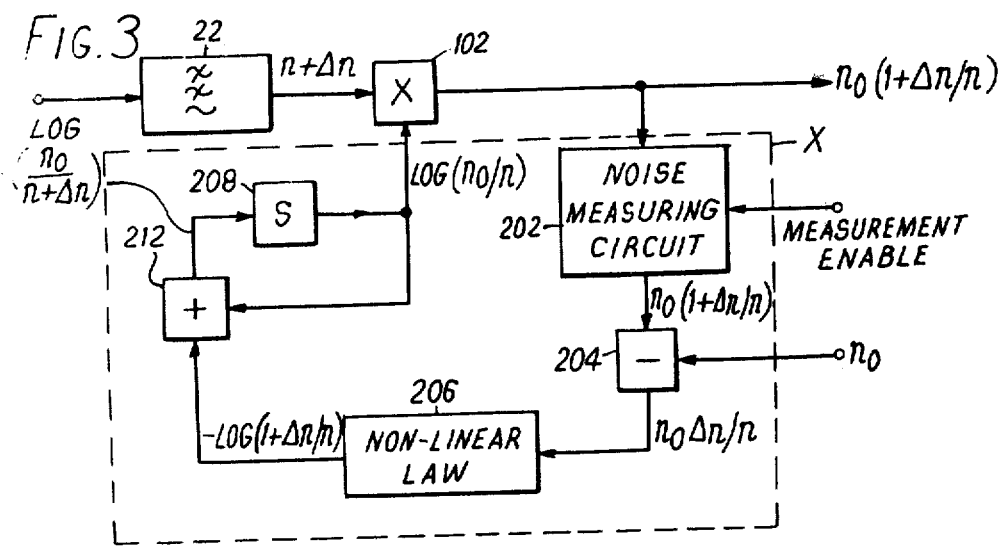

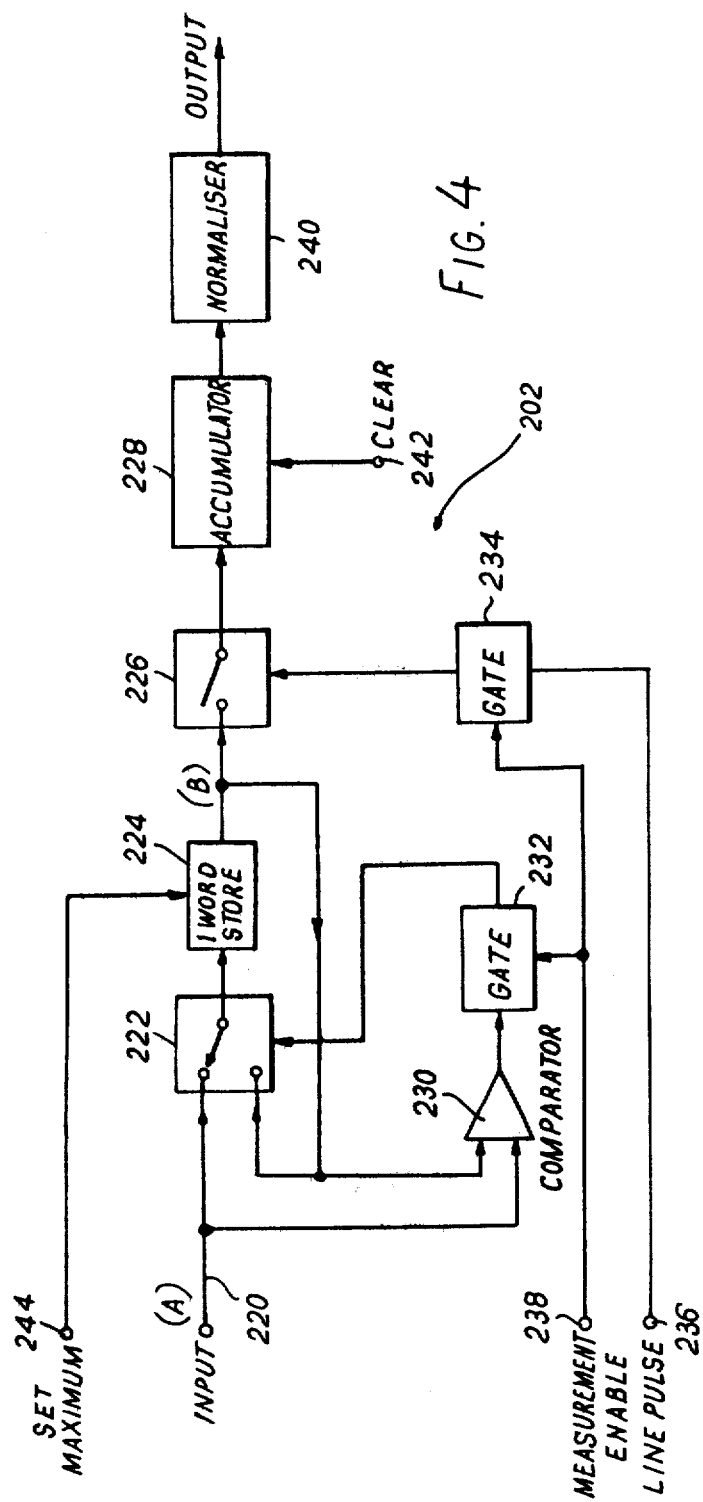

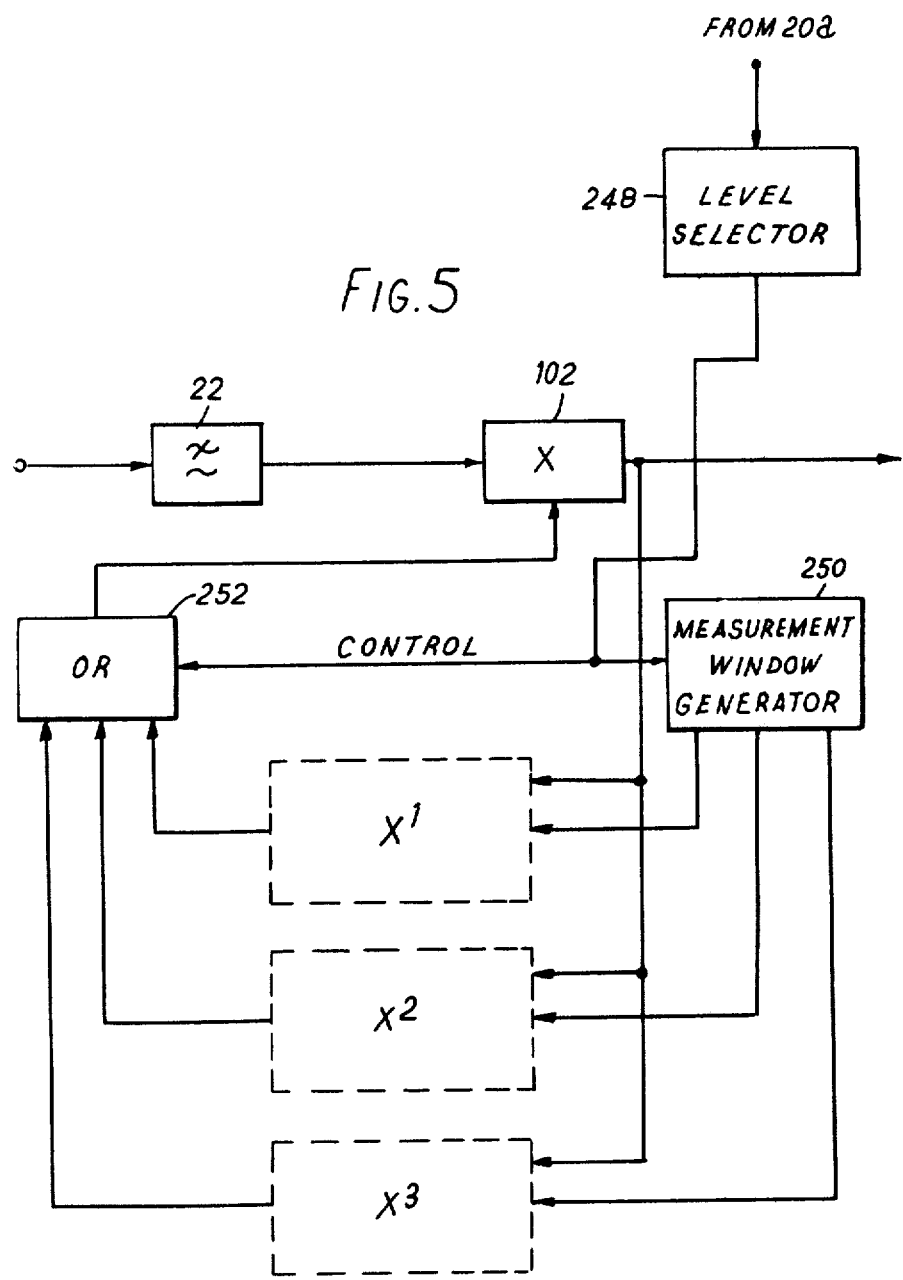

VIDEO NOISE REDUCTION SYSTEM

BACKGROUND OF THE INVENTION

This invention relates to a method of and apparatus for reducing the effect of noise in an electrical input signal which is obtained by scanning pictorial information, such as a television signal. In particular the invention is concerned with improvements in and modifications of the invention of U.S. Pat. No. 4,058,836.

Said earlier patent describes and claims a method of and apparatus for reducing the effect of noise in an electrical input signal which is obtained by scanning pictorial information on a field-by-field basis, to provide an output signal, in which a signal derived from a preceding-field output signal is subtracted from the input signal for the current field to provide a difference signal, low-amplitude portions of the difference signal are attenuated relative to high-amplitude portions thereof, and the thus-attenuated signal is added to the preceding-field output signal to provide an output signal for the current field.

As described in that patent, the attenuation is preferably achieved by a multiplier, one input of which is coupled to the subtractor output and the other input of which is coupled to the output of a non-linear transfer characteristic element which is also coupled to the subtractor output.

U.S. Patent Application Ser. No. 883,406 filed Mar. 6, 1978, now U.S. Pat. No. 4,194,219, (published as corresponding German Offenlegungsschrift No. 2,809,216) describes inter alia the use of a variable-gain element connected between the subtractor and the non-linear element.

The use of the variable gain element is of primary importance when the transfer characteristic of the non-linear element is such that below a predetermined value a constant maximum attenuation factor applies, and above this value the attenuation factor progressively reduces. The variable-gain element can then be adjusted manually so that the mean RMS noise level in the signal corresponds to the said predetermined value. The system is then optimally sensitive to motion.

This is a useful feature, but in practice the noise level in a signal can vary, particularly as between shots for example, and this would require continuous monitoring and adjustment to obtain the best results. This is impracticable.

I have also found that there is another problem associated with the variation in noise level across the grey scale. For example, gamma correction of thermally generated source noise, as in a camera, produces many times more noise amplitude at black than at white. On the other hand, gamma correction of signals produced by a telecine machine produces a film grain characteristic giving rise to noise which takes a peak value in the low level greys and is zero at black and white. If, as in these circumstances, the noise distribution over the gray scale is not uniform, then the setting of the variable-gain element can only be a compromise.

SUMMARY OF THE INVENTION

In accordance with a first aspect of this invention, the variable-gain element is automatically controlled in response to the value of a signal in the apparatus.

In accordance with a preferred aspect of this invention, the variable-gain element is automatically controlled by a noise monitoring circuit.

The invention is more fully defined in the appended claims, to which reference should be made.

BRIEF DESCRIPTION OF THE DRAWINGS

The invention will now be described in more detail, by way of example, with reference to the drawings, in which:

FIGS. 2 and 3 are block circuit diagrams of two modifications of part of the apparatus of FIG. 1;

FIG. 4 is a block circuit diagram of the noise measurement circuit used in the apparatus;

FIG. 5 is a block circuit diagram of part of noise-reduction apparatus embodying the invention in another aspect;

DESCRIPTION OF THE PREFERRED EMBODIMENTS

Figure 1:
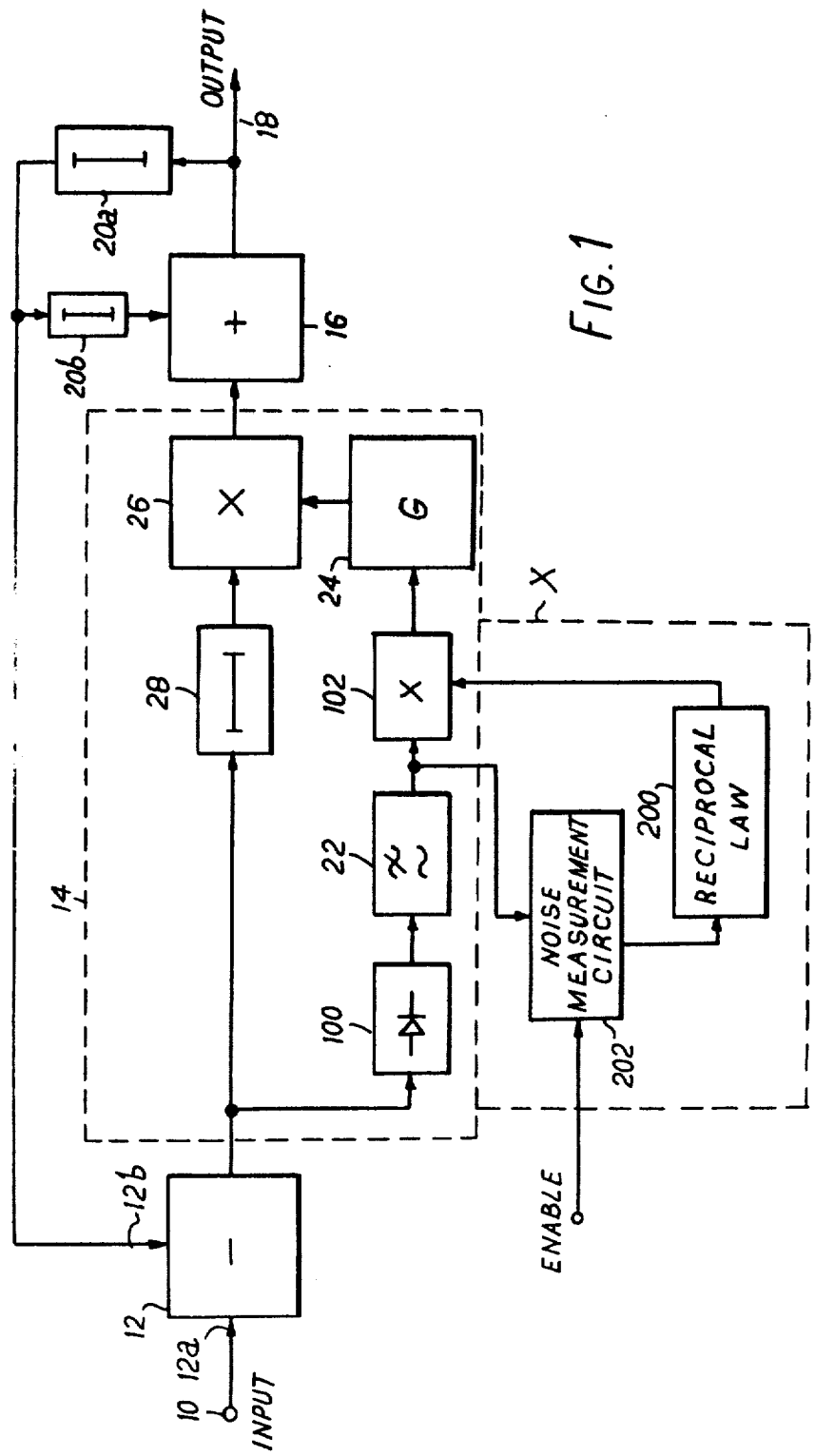
FIG. 1 is a block circuit diagram of noise-reduction apparatus embodying the invention in its first aspect, and is based on FIG. 3 of the drawings of U.S. Patent Application Ser. No. 883,406 above-mentioned.

Reference should first be made to the aforementioned Patent and application in which much of the circuit of FIG. 1 is described. Accordingly only a brief description of the parts of the circuit not intimately concerned with this invention will be given here.

The circuit of FIG. 1 receives an interlaced-scan television signal at an input 10 which is applied to a subtractor 12. The input signal for each picture period has subtracted from it the output signal for the preceding picture as supplied by delay device 20a to produce a difference signal representing the difference between the current and preceding picture periods. This difference signal is passed through an attenuator 14, which includes a multiplier 26 controlled by a circuit 24, and which is arranged to attenuate low-amplitude difference signals (assumed to be noise) by a greater factor than high-amplitude signals (assumed to represent movement). The thus-attenuated signal is then added back in adder 16 to the output signal for the preceding picture supplied by delay device 20b to provide the output signal for the current picture.

It will be appreciated that what the circuit of FIG. 1 does is to attenuate differences between a current input field and a preceding output field to provide an output for the current field. The attenuation is arranged to be greater when the differences are smaller than when they are larger. To this end, the apparatus includes input and output terminals 10 and 18, the delay device 20a coupled to the output terminal to provide a delay time of substantially one field, and attenuation circuitry consisting of blocks 12, 14 and 16 coupled to the delay device and the input terminal for attenuating the differences between the input and delayed output signals to provide the current output signal.

The circuit 24 is a non-linear transfer characteristic circuit preferably having a characteristic as shown in FIG. 2 of U.S. Patent Application Ser. No. 883,406. That is to say, below a predetermined value a constant maximum attenuation factor applies, and above this value the attenuation factor progressively reduces, until it reaches unity at a second value which is about three times the first value. To control the circuit 24, the difference signal from subtractor 12 is applied through a rectifier 100, a low-pass filter 22 (preferably a two-dimensional transversal filter), and a variable-gain element 102 constituted by a multiplier, to the circuit 24.

A delay element 28 compensates for any delays introduced by the filter 22. It is because of this that the delay device 20b is required as well as the delay device 20a, as described in U.S. Pat. No. 4,058,836.

The variable-gain element 102 can be adjusted, with a view to making the RMS value of the component of the difference signal corresponding to the noise level approximately equal to the predetermined value below which the maximum attenuation factor applies. As described with reference to FIG. 3 of U.S Patent Application Ser. No. 883,406, this adjustment is made manually.

In FIG. 1 of the present drawings, however, there is an additional circuit X in which the noise is measured electrically and which automatically controls the multiplier 102. The noise measurement is made in a noise measurement circuit 202 the output of which is applied to a reciprocal circuit 200, which in turn controls the multiplier 102. In this way the noise measurement can be updated once per field or per picture, and can control the multiplier 102 so that the signal level corresponding to the RMS noise level is kept at the input to the function circuit 24 to a desired fixed value, near to the said predetermined value. The construction of the noise measurement circuit will be described below with reference to FIG. 4.

The reciprocal circuit 200 produces an output signal which is inversely proportional to its input signal, and this output signal is the multiplier value. The reciprocal circuit can take the form of a read-only memory.

In FIG. 1 the measurement is made on the signal prior to the multiplier 102, this being an open loop or forward feed type of control. Alternatively a closed loop or feedback type of control can be adopted as shown in the modification of FIG. 2.

In FIG. 2 the noise measurement circuit 202 has its input connected to the output of the multiplier 102. The required reference level $n_o$ is then subtracted from the actual noise measurement in a subtractor 204, and the resultant error signal (plus or minus) is applied to a non-linear circuit 206, conveniently a read-only memory, which produces an output signal which represents the factor by which the current multiplier, stored in a store 208, must be multiplied to assume the correct value in the next field. The output signal from circuit 206 therefore multiplies in a multiplier 210 the output of the store 208 to generate a new input for the store. The stored value, which is held for a complete field or picture, is applied to the multiplier 102.

If the noise on the preceding field or picture was n and on a particular field or picture under consideration becomes $n + \Delta n$, the signal values are as shown on FIG. 2. The multiplier held in store 208 for the preceding field or picture will be $n_o/n$, so that the output of the noise measurement circuit is $n_o/n$ times $n + \Delta n$ which is $n_o(1 + \Delta n/n)$. From this $n_o$ is subtracted in subtractor 204 to leave $n_o \Delta n/n$.

The non-linear circuit 206 operates on the signal $n_o \Delta n/n$ to produce an output $(1 + \Delta n/n)^{-1}$. [It can be seen from this that the function required of circuit 206 is that from an input signal x it must form an output signal $(1 + x/n_o)^{-1}$.] This signal $(1 + \Delta n/n)^{-1}$ multiplies the value $n_o/n$ stored in multiplier 210 to give $n_o/(n + \Delta n)$, which is the required value for the field or picture under consideration.

Preferably the multiplier 102 is of logarithmic form so that it can handle a large dynamic range of noise levels. The control loop is then modified as shown in FIG. 3. In this case the non-linear circuit 206 produces from an input x an output $-\log(1 + x/n_o)$. Thus from an input $n_o \Delta n/n$ it produces an output of $-\log(1 + \Delta n/n)$, and this is added in an adder 212, replacing multiplier 210, to the value stored in store 208 to generate a new input for the store of the form $$\log\left(\frac{n_o}{n + \Delta n}\right).$$

In either of FIGS. 2 and 3 the multiplier 102 can if desired precede the filter 22.

In the case of either FIG. 2 or 3 quantisation of the signals in the non-linear circuit 206 will cause the multiplier value to oscillate about the theoretically required value, with a peak-to-peak variation of one quantum step. This idling or hunting behaviour can be made sufficiently negligible compared with noise measurement errors by suitable choice of the quantum step. It is also advisable to limit the range of the fixed relationship contained in the circuit 206, i.e. to limit the magnitude of its output, to guard against sudden changes due to shot changes.

The noise measurement circuit 202 will now be described in more detail. The object of the circuit is to detect the lowest value of RMS picture difference during each field, this being assumed to represent the noise level. In theory this value could be zero, but the smoothing of the spatial filter 22 ensures that the probability of this happening is very small. The RMS picture difference due to the noise alone can be considered to have a Gaussian probability distribution, with a mean and standard deviation proportional to the RMS noise input. The lowest value detected lies somewhere on the lower tail of this distribution with its own probability distribution.

Referring to FIG. 4, the input 220 is connected to one input of a selector switch 222, the output of which is connected to a one-word store 224. The output of store 224, as well as being connected to the other input of the selector switch 222, is connected through a switch 226 to an accumulator 228 and also to one input of a comparator 230 the other input of which is connected to the circuit input 220. The comparator output is applied through a gate 232 to control the position of the selector switch 222.

Line pulses are applied from a terminal 236 to control switch 226 via a gate 234. Both gates 232 and 234 receive an enabling signal from a terminal 238. When switch 226 is closed the value in store 224 is applied to the accumulator 228, the output of which is applied in turn to a normaliser circuit 240. The output of the circuit 240 constitutes the output of the noise measurement circuit 202. A clear signal can be applied to a terminal 242 to clear the accumulator, and a set maximum signal is applied to the store 224 from a terminal 244.

In operation, comparator 230 compares the input signal (A) with the stored value (B) in store 224 and controls switch 222 so as to select the lower of the two. Thus if B is less than A, then B is simply rewritten into the store, while if A is less than B, the stored value B is replaced by the new value A. Thus the stored value represents the minimum value obtaining. The store 224 is set to a maximum value from terminal 244 at the start of each television line and at the end of the line the store content is transferred to the accumulator 228, which is cleared at the start of each field. At the end of each field the accumulated sum of the minimum values is divided by the number of lines, and this quotient represents the average minimum over all the lines. This is used as the noise measurement.

To avoid false measurements the noise measurement circuit 202 should be disabled outside the active picture area, that is unless the predominant noise has been added to the composite signal. Preferably the area of measurement inhibition should extend somewhat into the active picture area to allow for the group delay of the filter 22. An appropriate enabling signal is applied to terminal 238 and controls gates 232 and 234. When gate 232 is disabled, switch 222 recirculates the stored value B.

The circuits thus-far described still suffer from the problem noted earlier due to non-uniform distribution of the noise across the grey scale. The circuit of FIG. 5 provides a desirable improvement in this respect.

In FIG. 5, a level selector circuit 248 is connected to receive the preceding-field signal from the delay device 20a of FIG. 1 (and from the predictor if present) and is connected to control a measurement window generator 250 and a combining or OR circuit 252. The level selector circuit 248 determines into which of a number of ranges across the grey scale the amplitude of the signal currently falls. It then controls the measurement window generator 250 which enables the signal from multiplier 102 to be measured by an appropriate one of three circuits $X^1$, $X^2$ and $X^3$, each of which can be similar to the corresponding circuit of FIG. 2 or FIG. 3, and which correspond to respective ones of the amplitude ranges. It will be appreciated that three circuits are shown only by way of illustration; the number required may differ from three. In one example four ranges are used. The selector circuit 252 synchronously applies to the multiplier 102 the output of the circuit X currently in use.

The selector 248 operates on the luminance component of the television signal and compares this with predetermined decision levels defining the ranges.

Precautions should be taken to guard against false measurement. First, the processed signal may excurse into a grey range for too short a time for the spatial filter 22 to give a valid measurement. If this excursion is into an area of higher noise level than the surrounding area, the lower, false measurement will be retained and cause an incorrect setting. To overcome this, the measurement enable signal (at terminal 238 in FIG. 4) generated by 250 is derived by shortening the range-enable periods (defined in selector 248) at their beginning and end by the group delay of the spatial filter 22.

Secondly, the processed signal may never excurse into a grey range during one or more lines. In this case no valid measurement will be transferred to the appropriate accumulator, and so the reference value is substituted. This dilutes the valid measurements on other lines and so with the open-loop control of FIG. 1 the multiplier setting is incorrect. However, with the feedback arrangements of FIGS. 2 and 3 it merely delays the time taken to adapt. Hence these arrangements are preferable to that of FIG. 1. If the grey range is absent from the whole picture, and no valid measurements result, then the multiplier value is frozen at the value obtaining for the last scan on which a valid measurement was achieved.

If, in the arrangement of FIG. 5, the circuits of FIGS. 2 and 3 are used, and the spatial filter 22 precedes the multiplier 102, as shown, and all settings are correct, there will still be an undesirable effect at high-contrast transitions if the noise varies markedly over the grey scale. This occurs because the spatial filter 22 smoothes the transition of the noise signal, which is then multiplied by a value having a sudden transition due to the fast grey-range selection. This causes an inflection in the signal applied to the function circuit 24 which results in a failure to noise-reduce on the lower-noise side of the transition. If the multiplier precedes the spatial filter 22, no such effect occurs because both multiplier and multiplicand can vary rapidly at the input to the spatial filter. This arrangement is therefore preferable on theoretical grounds.

It is assumed above that when the picture contains moving information there is always some part of the picture in each grey range or segment where a valid measurement of noise can be made, i.e. where no picture-difference signals due to movement are created. In practice I have found that such an assumption is invalid for most moving pictures. The result is that when the picture moves the measured noise level increases, and the resulting adaptation to the new measurement causes low-level texture to be smeared.

I have pursued two approaches in solving this problem. One has been to detect the presence of motion over the entire picture (globally), as opposed to locally, and inhibit 'upwards adaptation' if this occurs. The other approach has been to assume that the noise level changes only at a shot change and therefore to inhibit 'upwards adaptation' at all other times. In this context 'upwards adaptation' means the adaptation to a higher level of noise, i.e. reducing the control input signal to the multiplier 102.

Downwards adaptation, on the other hand, is always permissible and cannot be caused by movement but only by measurement errors. Adaptation in this direction only is conveniently referred to as 'ratcheting'. This carries the danger that a spuriously low measurement occurring on only one field will lock the adaptation into a state from which it cannot escape until the next set of events which allows upwards adaptation.

In practice three modes of operation can be used, namely:

1. Two-way (upwards and downwards) adaptation when no global motion; otherwise ratcheting.
2. Two-way adaptation for a number of fields after global motion has stopped; otherwise ratcheting.
3. Two-way adaptation for a number of fields after a shot change, but waiting until global motion has stopped; otherwise ratcheting.

The first mode of operation is critically dependent on the threshold of the "global motion" decision. For small amounts of motion, therefore, it allows upwards adaptation and does not cure the problem, i.e. small amounts of localised motion are smeared. However, global panning shots are adequately dealt with.

The second mode of operation is not so susceptible because after motion there is a good chance of a stationary scene occurring when the right setting will be obtained by ratcheting. Thereafter the setting is not disturbed until after the next sequence of global motion. The mode will fail, however, if the global motion is such as to oscillate about the threshold for detection so that a stationary scene never occurs.

The third mode of operation is safest in that the setting is least disturbed but carries the danger of ratcheting to too low a level if the intervals between shot changes are very long. It is also defeated by "lap dissolves" or fades between shots. To overcome this synthetic shot change signals can be generated at suitable intervals.

Figure 6:
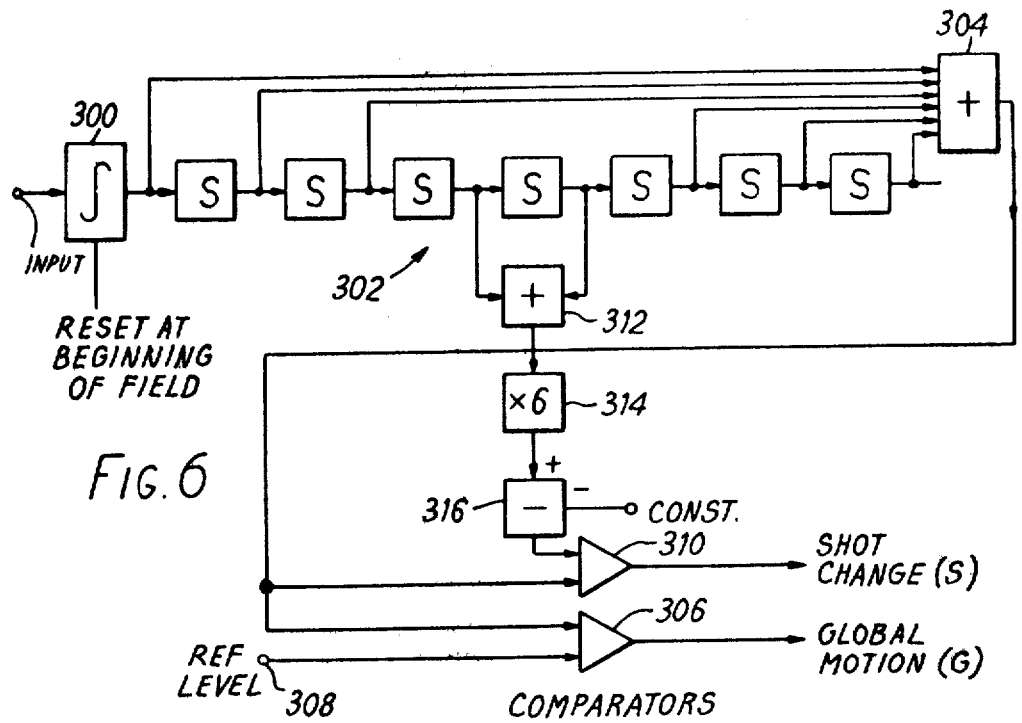
FIG. 6 is a block circuit diagram of a circuit for detecting "global" motion and shot changes in the picture.

The detection of global motion and shot changes may be carried out by the apparatus of FIG. 6, which accepts a signal from the spatial filter 22 or from the rectifier 100 and integrates this in an integrator 300 over the whole of the active field period. This signal thus represents the field-integral of the modulus of the picture-difference signal. The value so obtained is clocked into a seven stage shift register 302 clocked at field rate. In this way eight successive measurements are available at once. Global motion is sensed by summing in an adder 304 all the measurements except the central pair and comparing this sum in a comparator 306 with a suitable threshold value applied at an input 308. A shot change is sensed by comparing in a comparator 310 the sum from adder 304 with a value derived from the central pair of measurements. The mechanism is roughly to compare the actual value of the central pair with a prediction based on the neighbouring values derived by means of an adder 312, multiplier 314 and constant subtractor 316 connected as shown.

Figure 7:
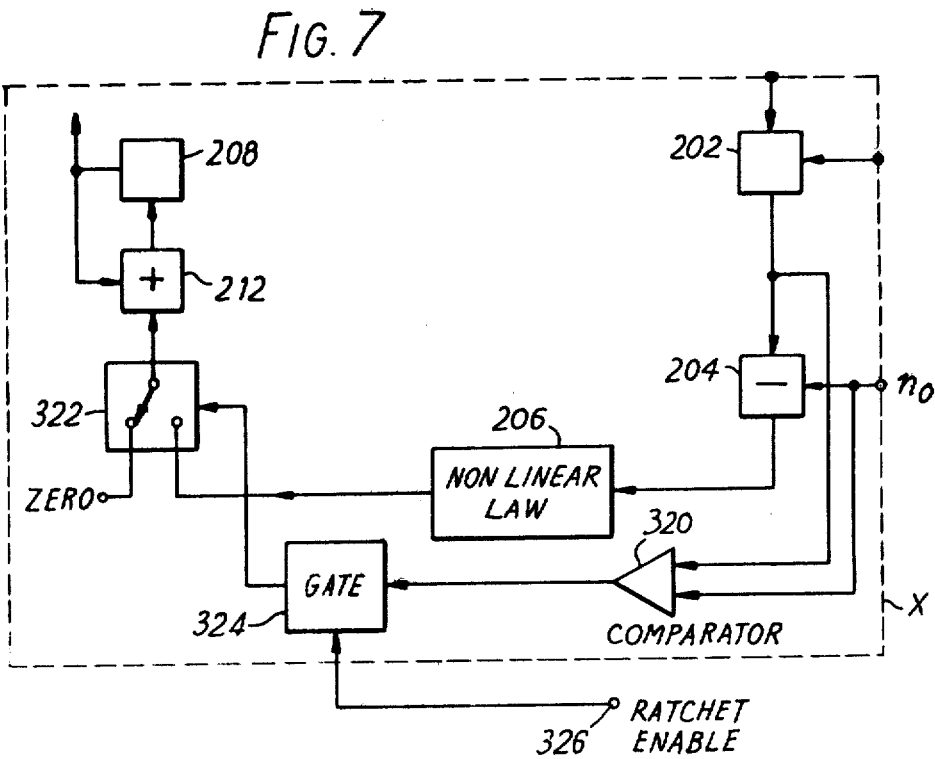
FIG. 7 illustrates the modifications required to the circuits of FIGS. 2 and 3 to enable them to be used with the detector of FIG. 6.

The signals so obtained are applied to the measurement circuits $X^1$, $X^2$, $X^3$ described above with reference to FIG. 5 through suitable interface circuits to realise the options described earlier. The measurement circuits are slightly modified so as to permit ratcheting. FIG. 7 shows this modification applied to the circuit of FIG. 3. The sign of the output of subtractor 204 is tested (shown in FIG. 7 by a comparator 320 acting on its inputs) and the comparator output overrides the output of the non-linear law circuit 206 by substituting in a switch 322 the value zero if the subtractor output is positive. Thus only negative inputs to circuit 206, corresponding to a decrease in noise level, have any effect. This ratcheting action can be enabled through a gate 324 by a signal applied to a ratchet enable terminal 326.

For option (1) mentioned above the global motion signal G of FIG. 6 is applied directly to this terminal 326. For option (2) the termination of the G signal initiates a counter, clocked at field rate, which is used to produce a pulse lasting for several field periods and which, when inverted, is applied to the ratchet enable terminal 326. The count is also made conditional upon the existence of sufficient valid measurements, i.e. a minimum specified number of lines are required to produce valid measurements in any field before the operation is enabled. For option (3) the counter is initiated by the shot change signal S of FIG. 6 with the count conditional upon the global motion signal G, i.e. the counting operation is suspended during the existence of the global motion signal.

Figure 8:
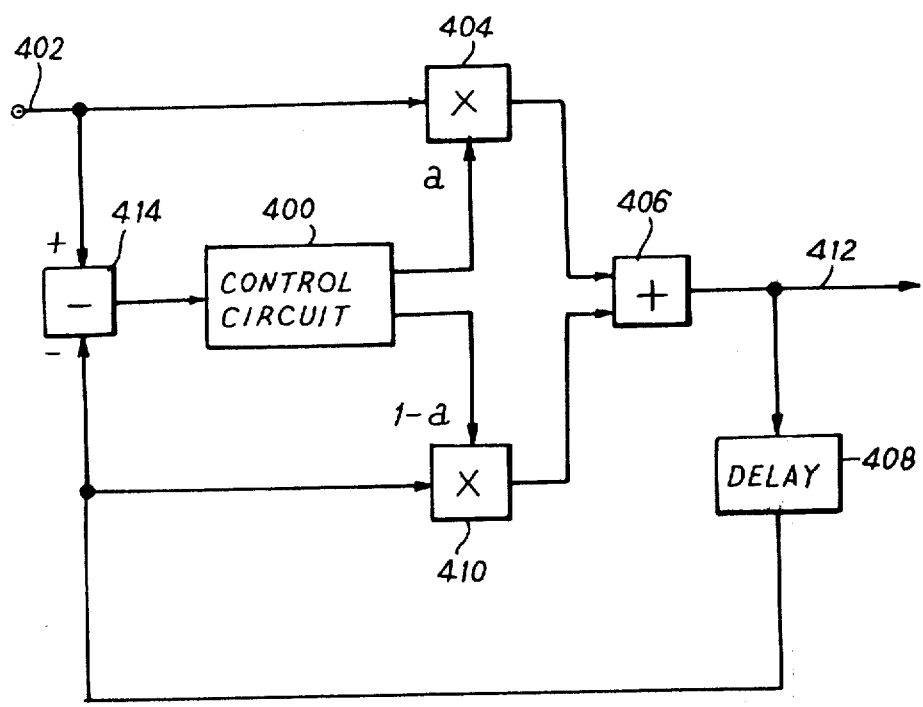
FIG. 8 is a block circuit diagram of an alternative noise reduction apparatus with which the invention can be used.

FIG. 8 shows a rearrangement of the circuit of FIG. 1 in which the control circuit constituted by the blocks 100, 22, 102, X and 24 on FIG. 1 is represented by a single block 400. The circuit is based on U.S. Pat. No. 4,064,530 and has an input terminal 402, a first multiplier 404 connected to the input terminal, an adder 406 having an input connected to the multiplier 404, a picture delay 408 connected to the output of the adder 406, and a second multiplier 410 connected to the output of the delay 408, the output of multiplier 410 being connected to the other input of the adder 406. Multipliers 404 and 410 receive respective multiplying factors from the control circuit 400 which are of the form $a$ and $1-a$ respectively, where $a$ is in the range from zero to unity. Compensating delays may be included at the inputs to the multipliers 404 and 410 and the delay 408 then shortened accordingly. The output 412 of the adder 406 constitutes the circuit output.

In the FIG. 1 circuit, the output is made up of the sum of the preceding output picture, plus $a$ times the difference between the current and preceding pictures. In FIG. 8, the output is made up of the sum of $a$ times the current picture and $(1-a)$ times the preceding picture. I.e. in FIG. 1:

Output $=a$ (Current − Preceding) + Preceding; in FIG. 8:

Output $=a$.Current $+(1-a)$ Preceding.

Thus the two outputs are mathematically identical, and the circuits are therefore precisely equivalent. In FIG. 8, as in FIG. 1, the input signal for the control circuit 400 is obtained from a subtractor 414 connected to the input terminal 402 and the output of the delay 408. The instrumentation of FIG. 1 is however preferred.

It will therefore be appreciated that all the improvements described with reference to FIGS. 1 to 7 are equally applicable to apparatus of the type shown in FIG. 8.

What is claimed is:

1. Apparatus for reducing the effect of noise in an electrical signal which is obtained by scanning, said apparatus comprising:

input and output terminals;

a delay device coupled to the output terminal for providing a delay time of substantially one scan; and means coupled to the input terminal and to the output of the delay device for attenuating differences between the input signal during the current scan and the output signal during a preceding scan to provide an output signal which is applied to the output terminal;

said means including a subtractor coupled to the input terminal and to the output of the delay device for providing a difference signal, and an attenuation circuit operative to provide a varying degree of attenuation in dependence upon said difference signal;

the attenuation circuit comprising:

variable-gain means coupled to the output of the subtractor;

non-linear transfer characteristic means coupled to the output of the variable-gain means; and multiplier means coupled to the output of the non-linear transfer characteristic means; and an adder coupled between the output of the multiplier means and the output terminal;

and wherein the apparatus further comprises:

noise-measurement means responsive to a signal in the apparatus automatically to vary the value of the gain of the variable-gain means;

said noise-measurement means being coupled to receive a signal representing the difference between the current scan and the output signal during a preceding scan.

2. Apparatus according to claim 1, wherein the noise-measurement means comprises means for measuring the lowest value of the difference signal in defined periods, and averaging these lowest values.

3. Apparatus according to claim 1, wherein said noise-measurement means is coupled to the subtractor output.

4. Apparatus for reducing the effect of noise in an electrical signal which is obtained by scanning, said apparatus comprising:
input and output terminals;
a delay device coupled to the output terminal for providing a delay time of substantially one scan; and
means coupled to the input terminal and to the output of the delay device for attenuating differences between the input signal during the current scan and the output signal during a preceding scan to provide an output signal which is applied to the output terminal;
said means including a subtractor coupled to the input terminal and to the output of the delay device for providing a difference signal, and an attenuation circuit operative to provide a varying degree of attenuation in dependence upon said difference signal;
the attenuation circuit comprising:
variable-gain means coupled to the output of the subtractor;
non-linear transfer characteristic means coupled to the output of the variable-gain means; and
multiplier means coupled to the output of the non-linear transfer characteristic means; and
an adder coupled between the output of the multiplier means and the output terminal;
and wherein the apparatus further comprises:
noise-measurement means responsive to a controlling signal in the apparatus automatically to vary the value of the gain of the variable-gain means,
said noise-measurement means comprising means for measuring the lowest value of the controlling signal in defined periods, and averaging these lowest values.

* * * * *